United States Patent [19]

Schmid et al.

[11] Patent Number: 5,791,295
[45] Date of Patent: Aug. 11, 1998

[54] TRAINING LEASH AND METHOD

[76] Inventors: Linda Anne Schmid; John A. Rasile. both of 22961 Bartolome, Mission Viejo, Calif. 92692

[21] Appl. No.: 679,095

[22] Filed: Jul. 12, 1996

[51] Int. Cl.$^6$ ............................................. A01K 27/00
[52] U.S. Cl. ...................... 119/793; 119/797; 119/864
[58] Field of Search ............................ 119/793, 792, 119/795, 797, 864, 905

[56] References Cited

U.S. PATENT DOCUMENTS

| | | | |
|---|---|---|---|
| D. 232,744 | 9/1974 | McGrew. | |
| 2,555,027 | 5/1951 | Clayton | 119/792 |
| 2,826,172 | 3/1958 | Buckle et al. | 119/792 |
| 3,311,088 | 3/1967 | Peterlin | 119/864 |
| 3,817,218 | 6/1974 | Bongiovanni | 119/864 |
| 5,329,885 | 7/1994 | Sporn | 119/792 X |
| 5,456,213 | 10/1995 | Beauchamp | 119/864 X |
| 5,511,515 | 4/1996 | Brown et al. | 119/864 X |

OTHER PUBLICATIONS

"No–Pull Halter" advertisement.
"Safari Harness" advertisement.

*Primary Examiner*—Gene Mancene
*Assistant Examiner*—Yvonne R. Abbott
*Attorney, Agent, or Firm*—Hoffman, Wasson & Gitler

[57] ABSTRACT

A training leash for use with an animal neck collar including a band having a first end and a second end, the band having a length defined between the first end and the second end. A first ring is mounted on the first end of the band, a first portion of the length of the band being received through the first ring, defining a loop encircling a torso of an animal. A second ring is slidingly mounted on the band and mounted on the collar. A second portion of the length of the band, between the first ring and the second ring, defines a distance which varies as a tension of the band varies. Other embodiments and a method also are disclosed.

10 Claims, 4 Drawing Sheets

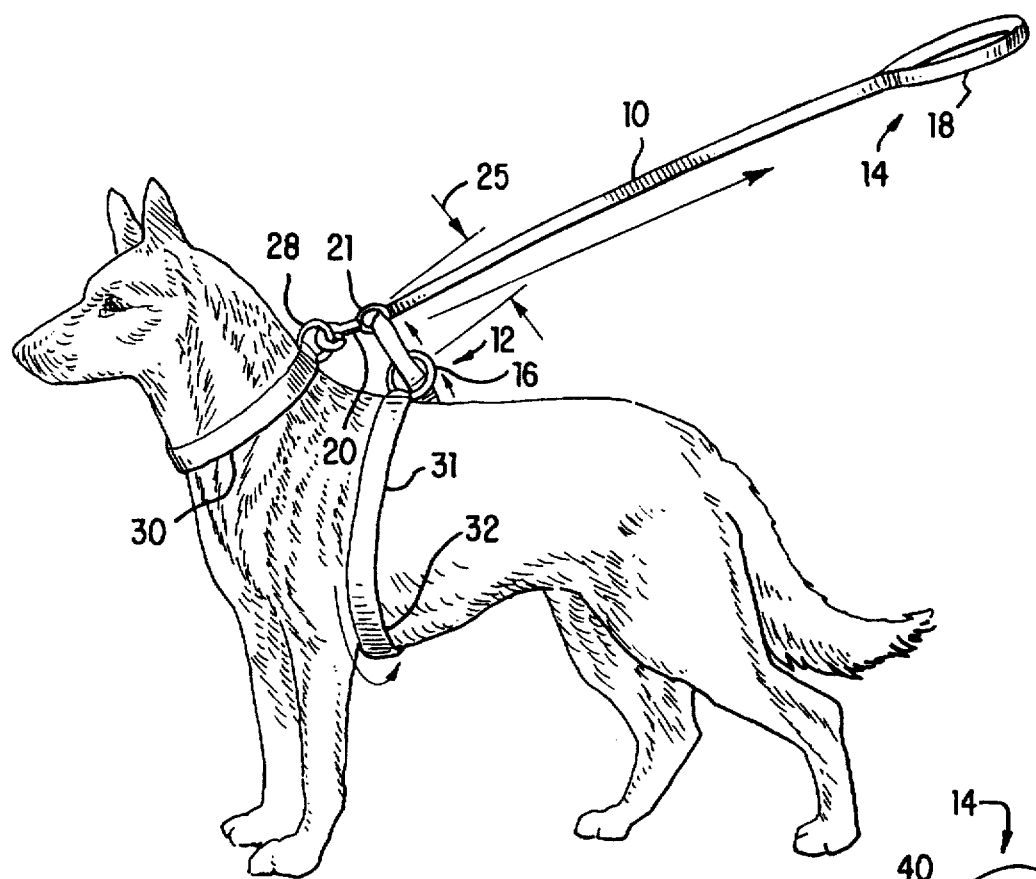
FIG. 1
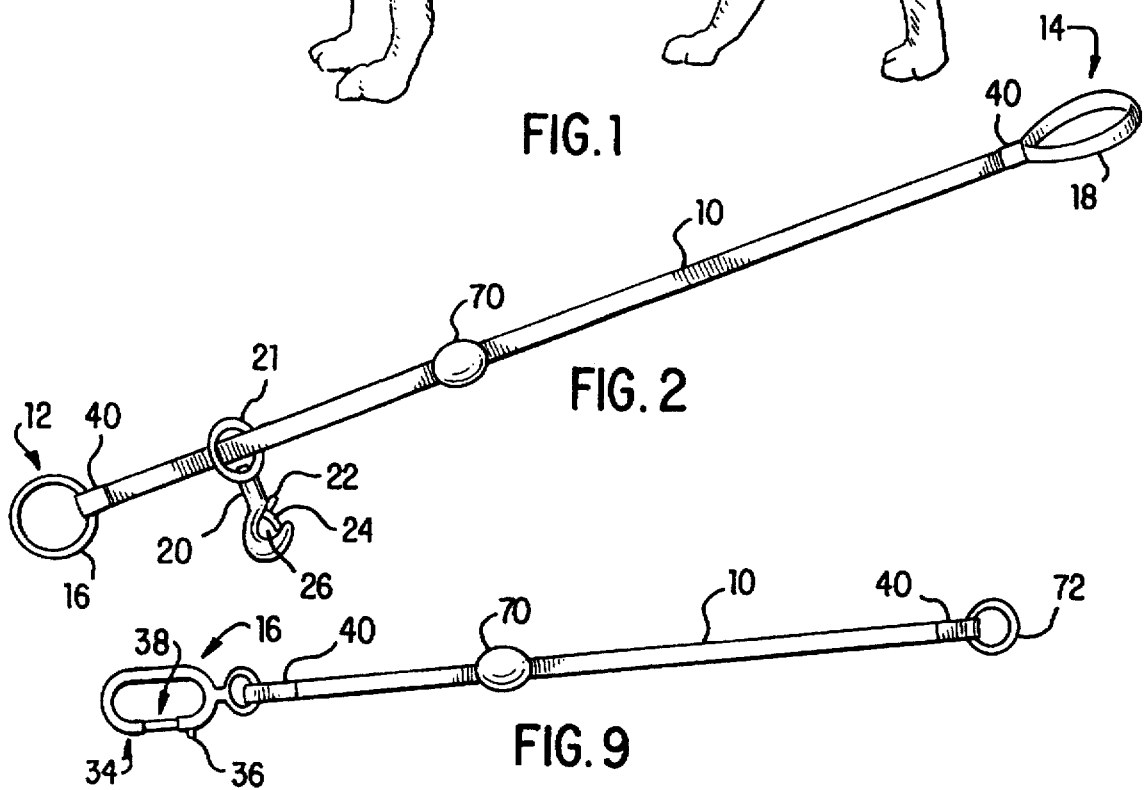
FIG. 2
FIG. 9

5,791,295

1

TRAINING LEASH AND METHOD

BACKGROUND OF THE INVENTION

1. Field of the Invention

The present invention relates to animal husbandry devices. More specifically, the instant invention relates to animal leashes.

2. Description of the Prior Art

A popular form of domesticating animals involves physically controlling the animal. The most well-known form of physical control includes a leash. Some forms of the leash include mechanisms for imparting discomfort on the animal as a consequence for failing to perform as instructed. For example, some mechanisms include "choker collars" which, when the animal pulls away from the trainer, cinches the animal's neck, choking it. Many regard this as inhumane or dangerous treatment of animals.

Still, most experts agree that exerting some discomfort on the animal helps to instill the discipline desired. Some animal trainers have developed leash devices that cinch the torso or armpits of the animal. However, these devices are complicated, do not cinch the torso while simultaneously pulling into the armpits of the animal, and do not provide for adapting to the animal's collar which the owner may favor. For example, U.S. Pat. No. 3,311,088, issued Mar. 28, 1967, to Henry Peterlin, describes a training and walking leash that includes a snap hook which fastens to a conventional dog collar. A chain portion extends from the snap hook to a distal end which is mounted to a ring. A second chain extends from the other side of the ring and terminates in a strap handle. The portion of chain between the ring and the strap handle is drawn through the ring to form a loop. The loop receives the torso of the animal. In practice, when the animal pulls against the leash, the loop is tightened around the torso of the animal. The apparatus itself does not pull through a collar ring on the dog collar, but merely fastens with a snap ring.

U.S. Pat. No. Des. 232,744, issued Sep. 10, 1974, to James D. McGraw, shows a chokeless neck rope for a horse. The device includes an elongated member having a loop at one end. A transverse member having a knob at its distal end, extends from the elongated member roughly where the loop bends back on itself and melds with the rest of the elongated member. A second transverse member, also terminating in a knob, extends out from the elongated member generally at is center. A loose ring is received on the elongated member between the two transverse members. In practice the loop is fed through the ring and receives the second transverse member, thus defining a loop which would encircle an animal's neck. The loop remains fixed and does not cinch the animal in any way. "Lupi Harness" advertisement shows a training leash which appears to employ a fixed neck loop that encircles the animal's neck. Two armpit straps extend from the front of the neck loop under the legs and up toward the back of the neck loop. The straps appear to meld and pass through a ring at the back of the neck loop.

"No-Pull Halter" advertisement shows a training leash that appears to employ a system similar to that of the "Lupi Harness," above. A special collar is fitted around the neck of the animal. Two straps fasten with clips to rings at the front of the collar. The straps pass under the legs, through rings at the back of the collar and fasten to a leash.

Clearly, the above demonstrates a need for a training leash including a simple, torso-cinching mechanism that also is drawn into the armpits of an animal as a deterrent to pulling against a leash.

2

None of the above references, taken alone or in combination, are seen as teaching or suggesting the presently claimed training leash.

SUMMARY OF THE INVENTION

The present invention is a training leash including a band having a first end and a second end. A first ring is mounted on the first end. A hand loop is mounted on the second end. A second ring is slidingly mounted on the band and fixed to the collar. The band is received through the first ring, defining a loop that encircles the animal's torso. When the trainer pulls on the hand loop, or more importantly, if the animal pulls away from the trainer, the band is drawn through the first ring, tightening the loop around the animal's torso. Simultaneously, the band is pulled through the second ring, drawing the loop toward the collar, into the animal's armpits. An optional stop may be mounted on the band to restrict the band from pulling through the rings, releasing the animal from the device.

In consideration of the above, a first objective of the invention is to provide a training leash that is simple to employ on an animal.

A second objective of the invention is to provide a training leash that does not require a specialized collar in order to be used.

A third objective of the invention is to provide a training leash that imparts discomfort on an animal's armpits when the animal attempts to pull away from the trainer or when the trainer pulls on the device.

A fourth objective of the invention is to provide a training leash that imparts discomfort on an animal's armpits by drawing a torso loop toward the animal's neck.

These and other objects of the present invention will become readily apparent upon further review of the following specification and drawings.

BRIEF DESCRIPTION OF THE DRAWINGS

FIG. 1 is a schematic view of the preferred embodiment of the invention secured to an animal.

FIG. 2 is a top plan view of the preferred embodiment of the invention.

FIG. 9 is a fragmentary top plan view of a further embodiment of the invention.

DETAILED DESCRIPTION OF THE INVENTION

Figure 3:
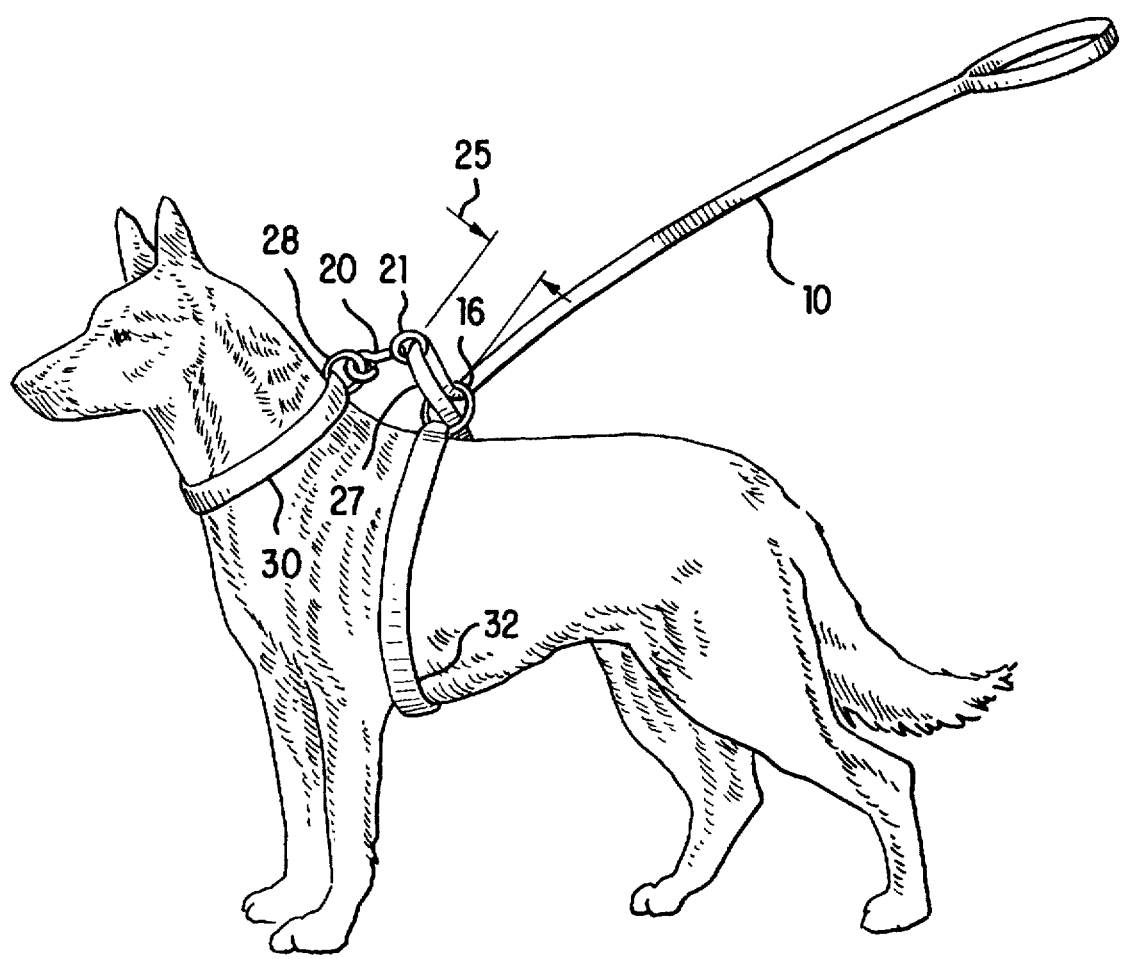
FIG. 3 is a schematic view of another embodiment of the invention secured to an animal.

Referring to FIG. 1, the preferred embodiment of the present training leash is shown adapted to cooperate with a conventional collar and cinchingly encircle the animal's torso. The preferred embodiment of the invention includes an elongated band 10 having a first end 12 and a second end 14. Preferably, the band 10 is constructed from nylon webbing. First ring means 16 is mounted on the first end 12. A hand loop 18 may be mounted on the second end 14.

Referring also to FIG. 2, a second ring means 20 slidingly receives the band 10 through an eye 21. The term "second ring means" is employed in a generic sense; the term embraces all devices that promote maintenance of the band relative to the collar 30, preferably those allowing the band to slide freely therethrough. In the embodiment shown, the second ring means 20 is a conventional snap including a spring-loaded lever 22 for opening a segment 24. The second ring means 20 defines an open area 26 which selectably receives a ring 28 of a conventional collar 30. As alluded to above, the invention is not limited to employment of a collar ring 28, but is intended to incorporate any means for maintaining the band relative to the collar 30, preferably in a sliding manner.

To employ the present training leash, a first portion 31 of the length of the band 10 is fed through the first ring means 16, defining a loop 32 that receives the animal's torso. The second ring means 20 is connected to the collar 30. A second portion of the band 10 between the first ring means 16 and the second ring means 20 defines a distance 25. As shown, the distance 25 is defined between the eye 21 and the first ring means 16. When the animal pulls against the leash, a tension is generated in the band 10. The band 10 is drawn through the first ring means 16, tightening the loop 32, and through the eye 21 of the second ring means 20, drawing the loop 32 toward the collar 30 and into the armpits of the animal, reducing the distance 25. The distance 25 varies as the tension in the leash varies. This tightening cinching sensation discourages the animal from continued pulling against the leash. Additionally, the collar 30 is drawn up and back with respect to the animal's neck, providing additional discomfort that discourages pulling against the leash. This is much more effective for animal training than the devices shown in the "No-Pull Halter" "Lupi Harness" advertisements, discussed supra. In these devices, the collar is drawn downwardly.

Although the Peterlin device, discussed supra, describes a device that provides for compressing an animal's midsection, the distance between the collar and the midsection loop remains fixed. The present invention provides for decreasing the distance 25 between the collar 30 and the torso loop 32. As shown, the distance 25 defined between the eye 21 of the snap and the first ring means 16 decreases as tension in the band 10 increases. This distance reduction intensifies the discomfort the animal experiences, discouraging it from pulling against the leash.

The invention also provides the user with better leverage over the animal. The band 10, having led through both the first ring means 16 and the second ring means 20, is predisposed to remain on top of the animal, rather than becoming wrapped around its neck or wound through its legs.

Referring to FIG. 9, the first ring means 16 may include means for selectably providing access into the first ring means 16, shown in this embodiment as a snap 34. The snap 34 includes a spring-loaded lever 36 which the user may actuate to open a segment 38 in order to receive a ring, band 10 or like element.

Referring to FIG. 2 or 9, the first ring means 16 or hand loop 18 may be attached to the band 10 with a rope clip 40. The bitter end of the first end 12 of the band 10 is wrapped around the first ring means 16 and back onto itself. An undeformed rope clip 40 is placed over both thicknesses of the band 10 and compressed such that both thicknesses are frictionally trapped within the rope clip 40. Alternatively, the bitter end of the first end 12 of the band 10 is wrapped around the first ring means 16 back onto itself, then sewn or knotted.

Figure 5:
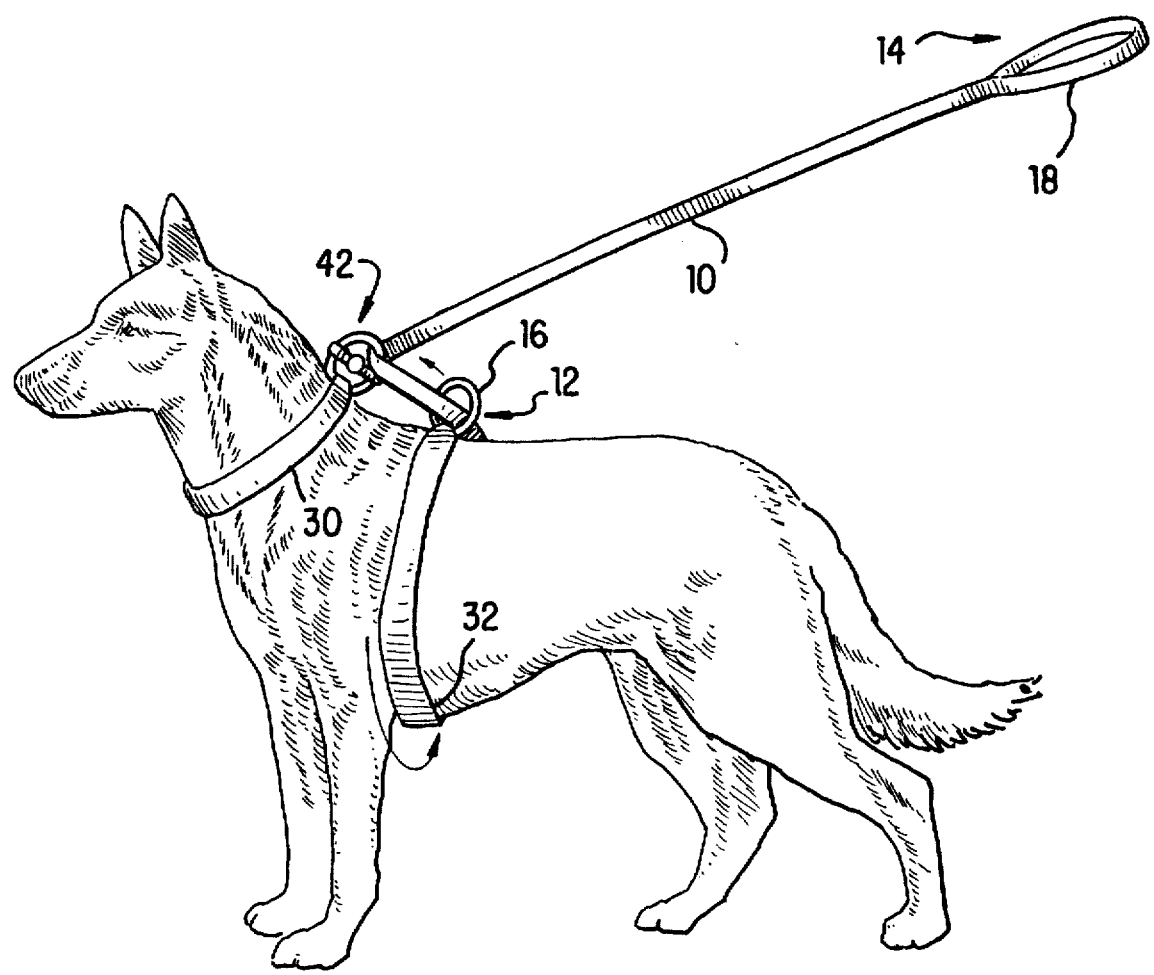
FIG. 5 is a schematic view of still another embodiment of the invention secured to an animal.
Figure 6A:
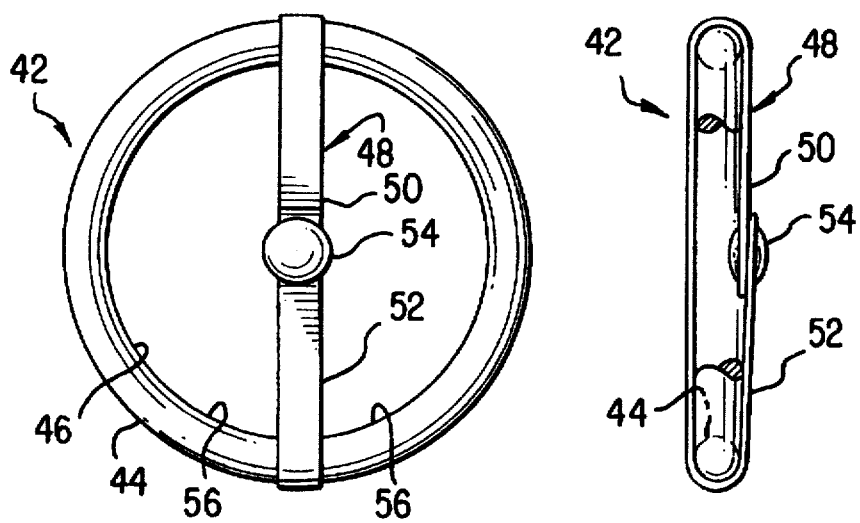
FIG. 6A is a fragmentary side elevational view of one embodiment of a collar ring.
Figure 6B:
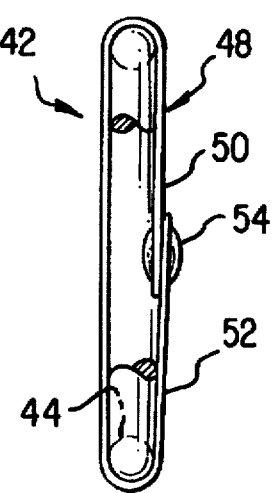
FIG. 6B is a fragmentary front elevational view of the collar ring shown in FIG. 6A.

Referring to FIGS. 5, 6A and 6B, another embodiment 42 of the second ring means 20 is shown. This embodiment 42 provides a conventional steel or hard plastic ring 44. The ring 44 defines an interior "area" 46 which limit the size of the band 10 which may pass the therethrough. A flexible, but non-elastic strap 48 defines a cord across the ring 44. The strap 486 has two ends, 50 and 52, each having complementary components for an interengaging snap 54 for fastening them together. Having been fastened, the strap 48 and ring 44 define two smaller "areas" 56. The strap 48 may simply decrease the entire area 46, rather than create distinct area 56 as shown. The areas 56 need not be symmetrical. In this case, only one of the areas 56 receives the band 10 when the device is installed on an animal, the other area 56 not being needed. The purpose for providing means to limit the area 56 of the second ring means 20 is described below.

Figure 7:
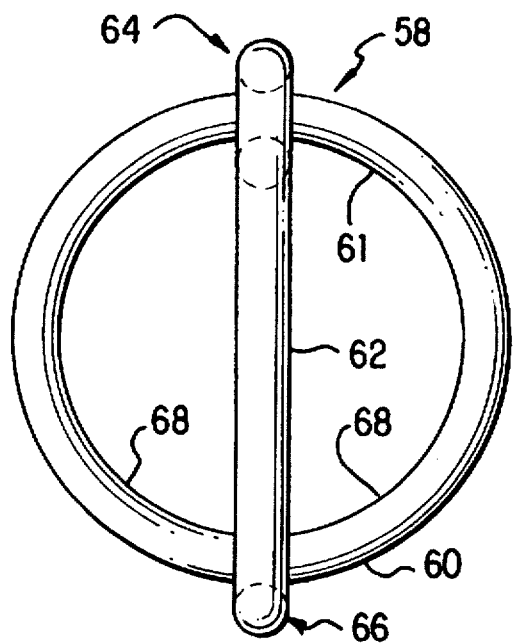
FIG. 7 is a fragmentary side elevational view of a another embodiment of a collar ring.

Referring to FIG. 7, a third embodiment 58 of the second ring means 20 is shown including a metal ring 60, defining an area 61. A hasp 62 in rotationally fixed to the ring 60 at one end 64. The other end 66 of the hasp 62 frictionally engages with another part, preferably at the opposite end, of the ring 60. As with the other embodiments of the second ring means 20, the hasp 62 and ring 60 define two smaller areas 68. The hasp 62 simply may decrease the entire areas 61, rather than create distinct areas 68 as shown. The purpose for providing means to limit the area 61, of the second ring means 20 is described below.

Regardless of which embodiment of the second ring means 20 is employed, it may employ means (not shown) for selective disengagement from the band 10. This means (not shown) may include, for example, a spring-loaded lever arrangement, similar to that shown on FIGS. 2 or 9, for receiving the band 10. The second ring means 20 may include means (not shown) for selectably receiving the band 10 as well as the collar 30.

Referring again to FIG. 2 or 9, preferably, the invention includes stop means 70 detachachably mounted generally at the center of the band 10. The stop means 70 is configured such that it may not pass through the areas 21, 56 or 6B of the various embodiments of the second ring means 20. The stop means 70 may be advanced to any position on the band 10 so as to provide for loops 32 that accommodate various sizes of animals. Preferably, the stop means 70 is a bead, as shown. However, the stop means 70 may be a conventional cord lock or star-, cross-, v- or like-shaped element (not shown) that discourages the band 10 from passing through the aforementioned areas, preventing the device to coming loose from the animal.

Figure 8:
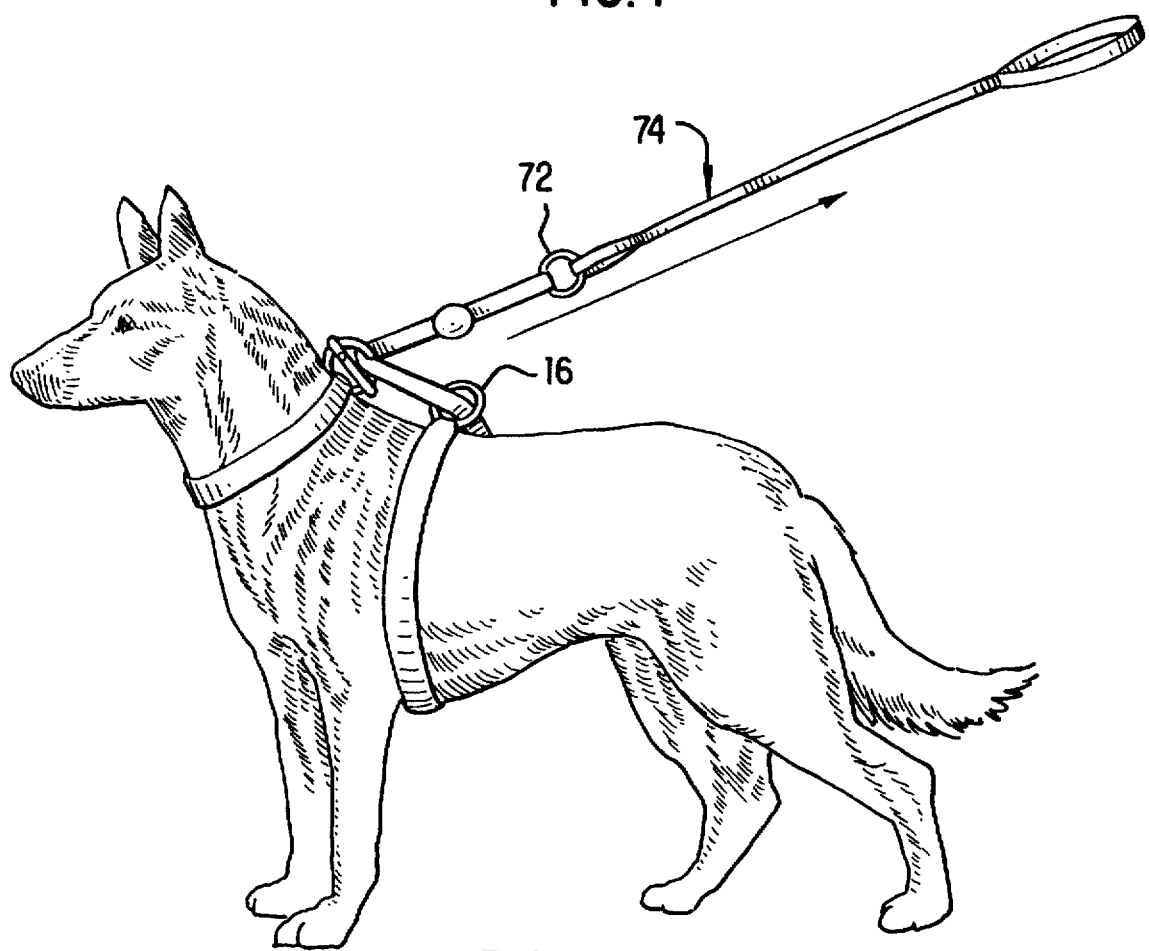
FIG. 8 is a schematic view of yet another embodiment of the invention secured to an animal.

Referring to FIGS. 9 and 8, another embodiment of the invention provides, rather than a hand loop, a third ring means 72, which may be mounted on the band 10. The third ring means 72 permits the user to attach and employ a conventional leash 74 with the invention. The third ring means 72 is dimensioned and configured to be received through the first ring means 16 at the first end 12 of the band 10. This convention provides for easy installation of the invention on an animal.

Referring to FIG. 3, another embodiment of the invention is shown. Rather than the leash 10 being pulled entirely through the first ring means 16, as in the embodiment shown on FIG. 1, the second ring means 20, shown as a snap, is fed through the first ring means 16, defining a second loop 27, and attached to the collar 30, as shown, to the ring 28 of the collar 30. The second ring means 20, or eye 21 of the snap as shown, freely slides along the second loop 27. This doubling back reduces the rate at which the distance 25 decreases relative the rate the leash 10 is drawn away from the animal, similar to the block and tackle arrangement commonly employed for hoisting objects. Especially in cases where the invention is employed on larger animals, the reduction gives the trainer more leverage over the animal. Also, this embodiment permits the user to impart more rearward pull sensation against the animal's neck, unlike in the preferred embodiment, where the torso loop 32 is urged toward the collar 30. This discomfort modification may more effectively convince the animal to heel.

Figure 4:
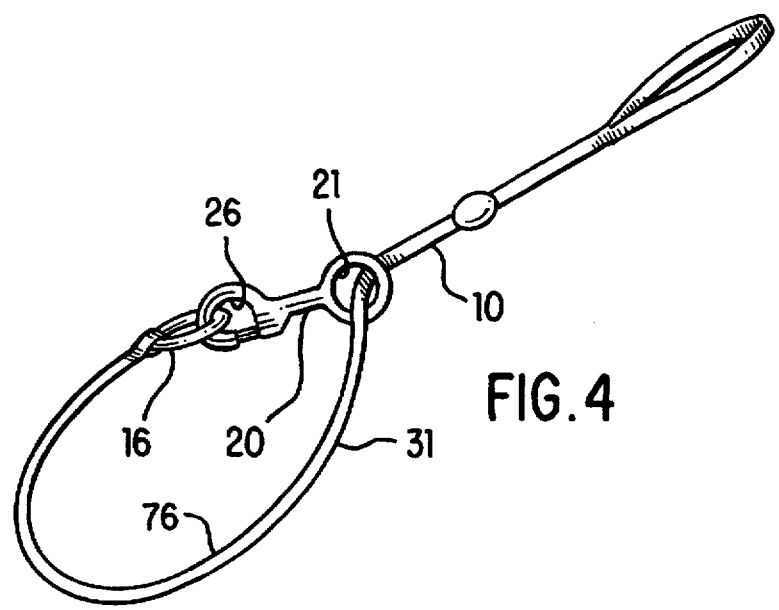
FIG. 4 is a schematic view of the an yet another embodiment of the invention.

Referring to FIG. 4, the invention may be employed as a conventional choker collar. The open area 26 receives the first ring means 16 of the band 10. A first portion 31 of the length of the band 10 is fed through the eye 21 of the second ring means 20, defining a loop 76 having a size that receives the animal's neck. When the animal pulls against the leash, a tension is generated in the band 10. The band 10 is drawn through the through the eye 21 of the second ring means 20, tightening the loop 76. The loop 76 is reduced in size as the tension in the leash increases. This tightening cinching sensation discourages the animal from continued pulling against the leash.

The present invention is not intended to be limited to the embodiments described above, but to encompass any and all embodiments within the scope of the following claims.

We claim:

1. A training leash for use with an animal neck collar comprising:

a band having a first end and a second end, said band having a length defined between said first end and said second end;

a first ring mounted on said first end of said band;

a first portion of said length of said band being received through said first ring, defining a loop encircling a torso of an animal;

a second ring slidingly mounted on said band, said second ring being mountable on said collar;

a second portion of said length of said band, between said first ring and said second ring, defining a distance, said distance varying as a tension of said band varies; and a manually positioned slidable stop mounted on said band along said length of said band, for preventing said loop encircling said torso of said animal from loosening.

2. A training leash as recited in claim 1, wherein said first ring includes means for selectably providing access into said first ring.

3. A training leash as recited in claim 1, wherein said stop is a bead.

4. A training leash as recited in claim 1, further comprising means for restricting passage of said stop means therethrough mounted on said second ring.

5. A training leash as recited in claim 4, said means for restricting passage of paid stop comprising:

a first strap having a first end and a second end, said first end being mounted on said second ring;

a first snap mounted on said second end of said first strip;

a second strap having a first end and a second end, said first end being mounted on said second ring;

a second snap mounted on said second end of said second strap; and said first snap and said snap being interengaged.

6. A training leash as recited in claim 4, said means for restricting passage of said stop comprising a hasp having a first end and a second end, said first end being rotatably mounted on said second ring, said second end being frictionally engageable with said second ring, fixing said hasp to said second ring.

7. A training leash as recited in claim 1, wherein said second ring comprises at least one means for selectably providing access into said second ring.

8. A training leash as recited in claim 1, further comprising a hand loop mounted on said second end of said band.

9. A training leash as recited in claim 1, further comprising a third ring mounted on said second end of said band.

10. A training leash as recited in claim 1, wherein said second portion of said length of said band, is received through said first ring, defining a second loop, said second ring being mounted on said second loop.

* * * * *